(12) United States Patent
Ajimu et al.

(10) Patent No.: US 6,223,001 B1
(45) Date of Patent: *Apr. 24, 2001

(54) METHOD OF CHECKING MAGNETIC HEADS, AND FILM CARRIER

(75) Inventors: Shuji Ajimu; Mitsukazu Hosoya; Toshikazu Kaji, all of Kanagawa (JP)

(73) Assignee: Fuji Photo Film Co., Ltd., Kanagawa (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/666,740

(22) Filed: Jun. 20, 1996

(30) Foreign Application Priority Data

| Jun. 29, 1995 | (JP) | ................................................ 7-164086 |
| Jul. 21, 1995 | (JP) | ................................................ 7-185745 |
| Sep. 20, 1995 | (JP) | ................................................ 7-241618 |

(51) Int. Cl.⁷ .................................................. G03B 17/24
(52) U.S. Cl. ............................. 396/311; 396/319; 355/40
(58) Field of Search .................................. 396/310, 319, 396/311; 355/40, 41, 42, 43

(56) References Cited

U.S. PATENT DOCUMENTS

| 5,130,728 | * | 7/1992 | Goto et al. ........................... 396/319 |
| 5,220,367 | * | 6/1993 | Matsuyama ......................... 396/319 |
| 5,247,321 | * | 9/1993 | Kazami ................................ 396/319 |
| 5,302,986 | * | 4/1994 | Kazami ................................ 396/319 |
| 5,439,186 | * | 8/1995 | Merle et al. ....................... 242/348.1 |
| 5,612,757 | * | 3/1997 | Amano ................................ 396/319 |

* cited by examiner

*Primary Examiner*—David M. Gray
(74) *Attorney, Agent, or Firm*—Sughrue, Mion, Zinn, Macpeak & Seas, PLLC

(57) ABSTRACT

A film carrier which, with a simple structure, can accurately check whether a reading head and a recording head are operating appropriately. Data for checking is determined in advance, and when a negative film begins to be withdrawn, direct current voltage is applied to the recording head. A leading end of the negative film is detected. Thereafter, the negative film is conveyed a fixed amount, the recording head records the data for checking, and the reading head reads recorded data. Next, read data and the data for checking are compared. When the read data and the data for checking do not match, it is determined that there is an abnormality in the recording head or the reading head, and error processing is carried out.

12 Claims, 10 Drawing Sheets

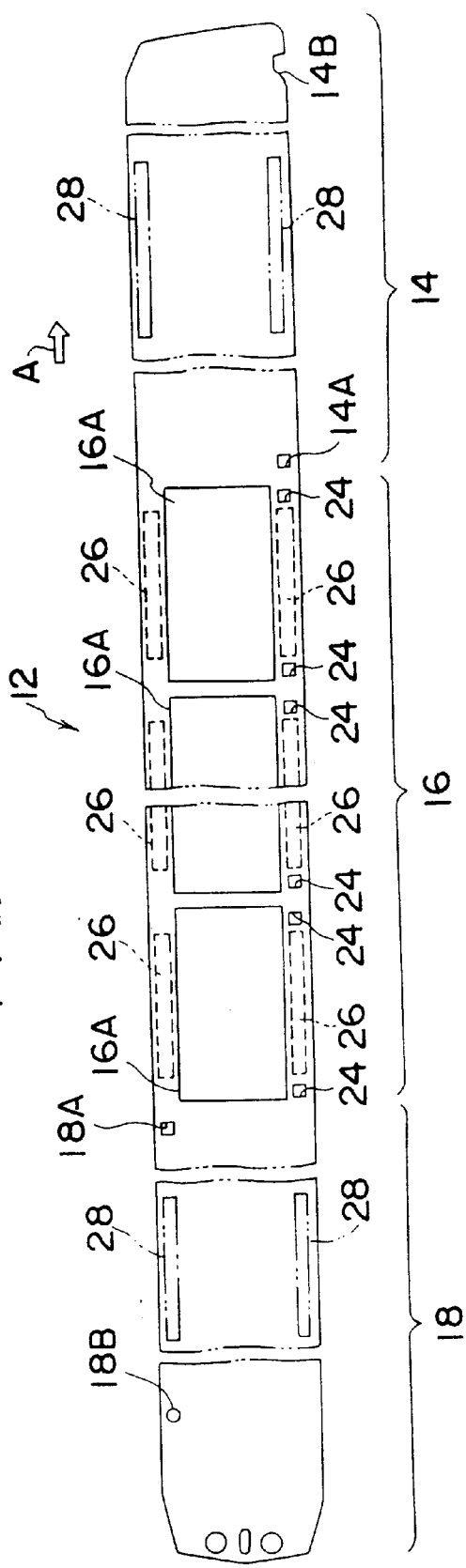
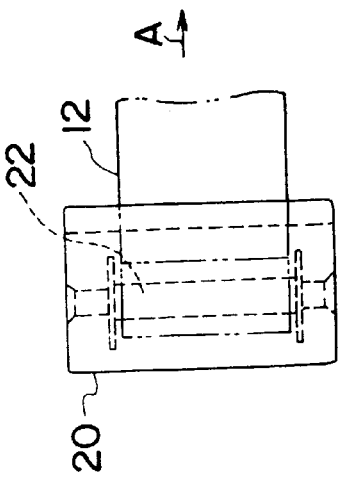

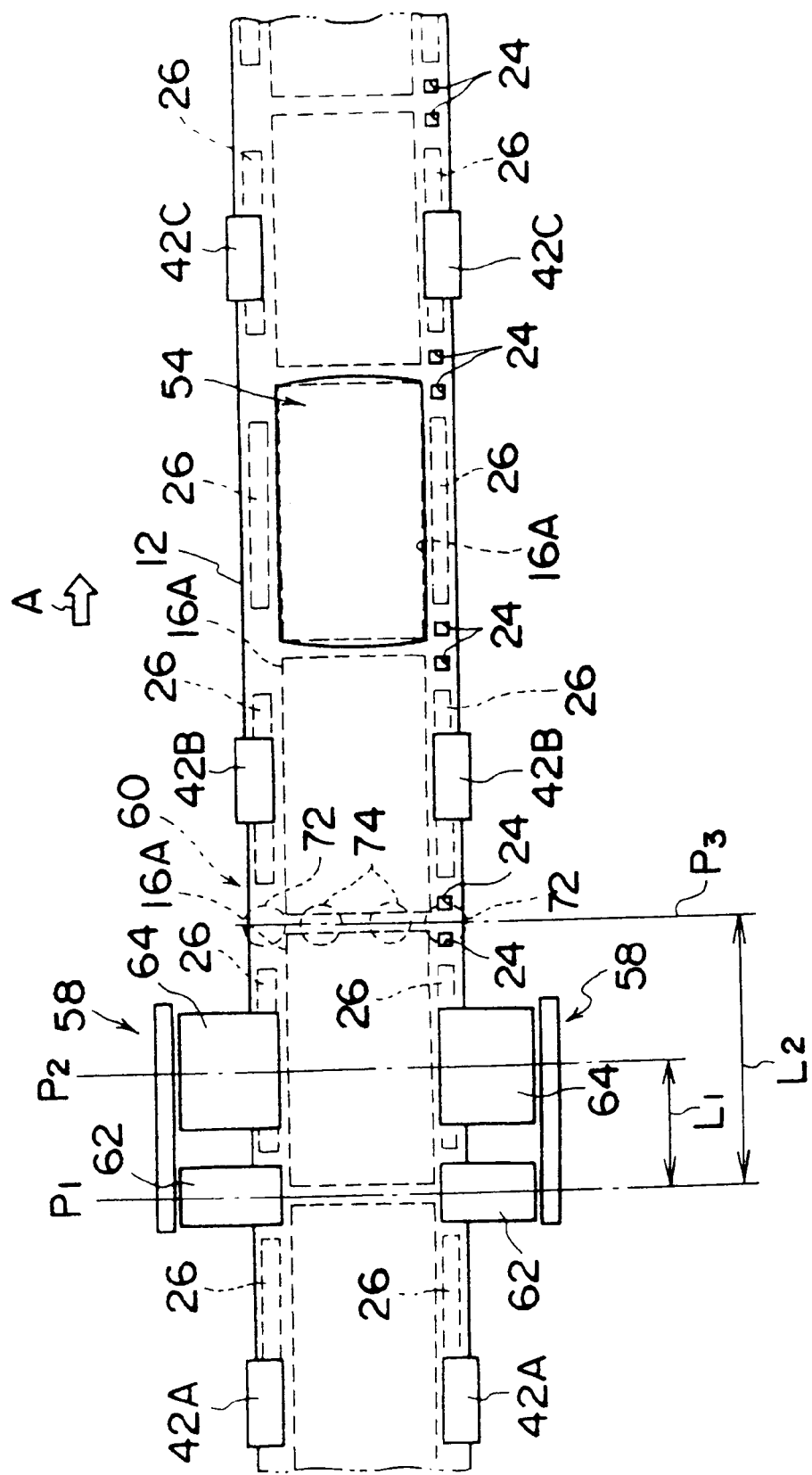

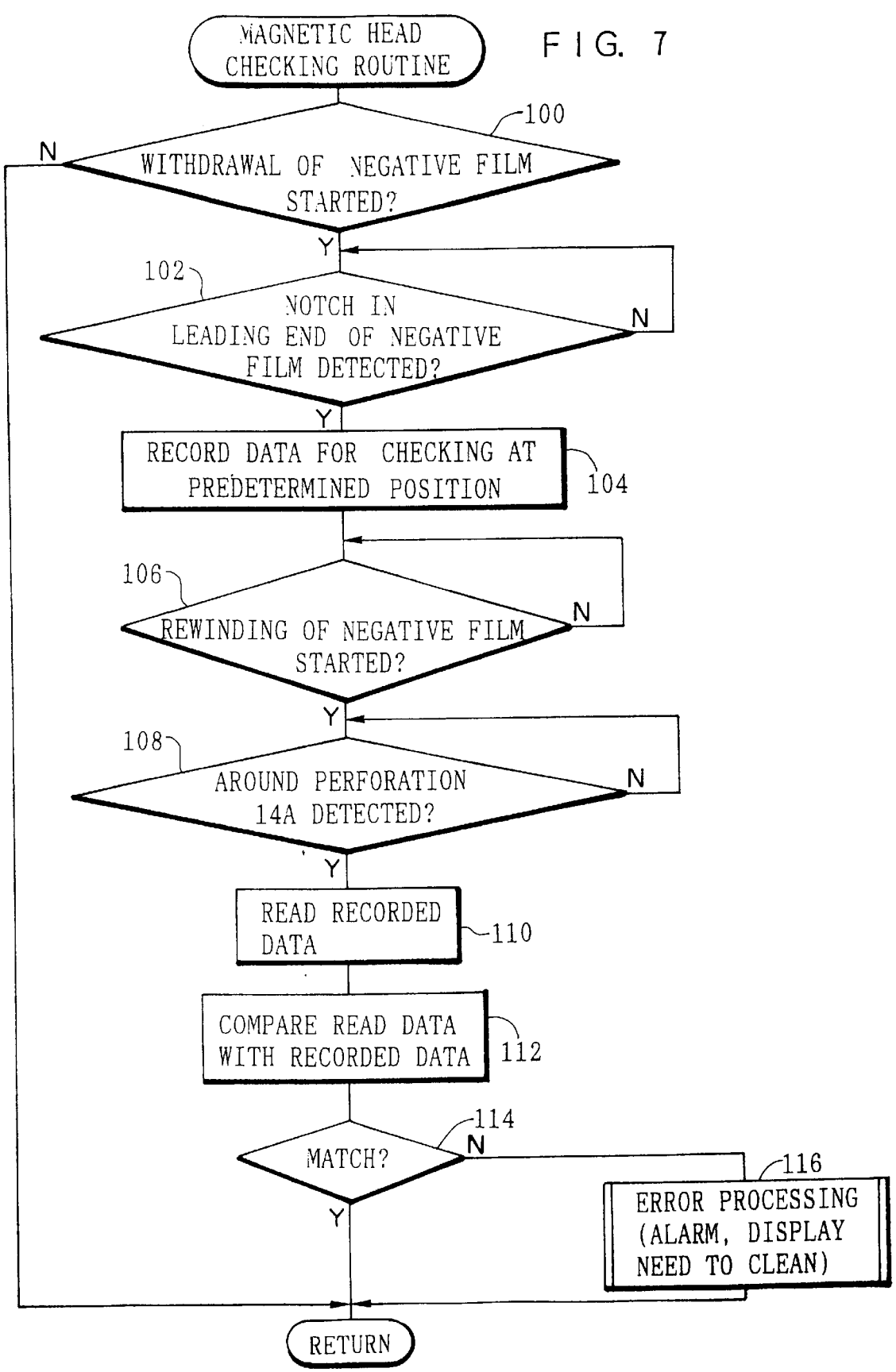

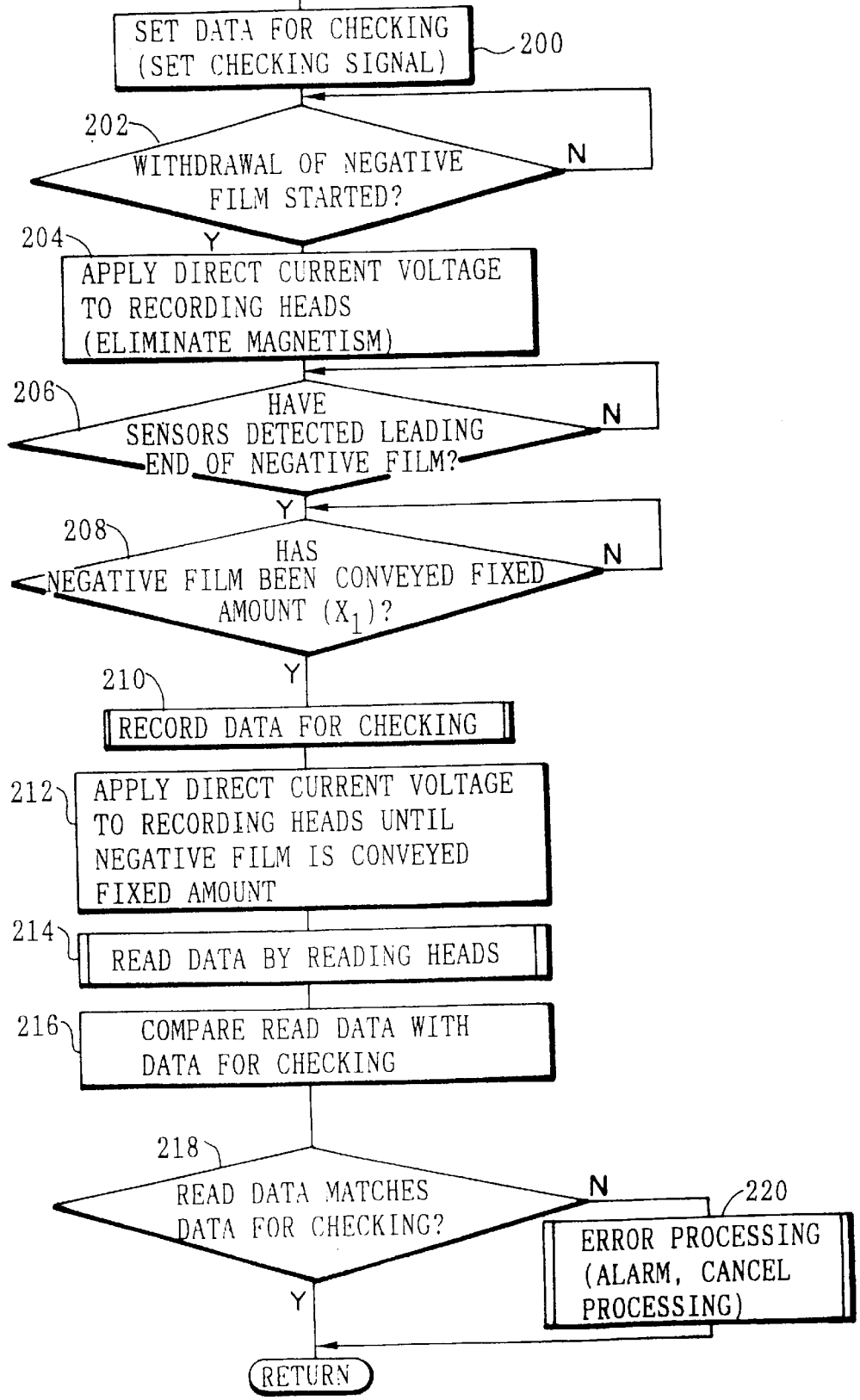

METHOD OF CHECKING MAGNETIC HEADS, AND FILM CARRIER

BACKGROUND OF THE INVENTION

1. Field of the Invention

The present invention relates to a method of checking magnetic heads which record magnetic information on a strip-like magnetic material such as a photographic film or the like provided with magnetic recording layers and which read magnetic information, and to a film carrier which positions image frames of a photographic film successively at a predetermined printing position during printing processing and which is equipped with magnetic heads which record magnetic information onto the photographic film and read recorded magnetic information.

2. Description of the Related Art

In recent years, photographic systems have been proposed in which magnetic recording layers are provided at predetermined positions of non-image portions of a photographic film (e.g., a negative film), and information regarding the negative film, information at the time of photographing the images of the respective frames, information at the time of printing the images of the respective frames onto a photographic printing paper, and the like are recorded on the magnetic recording layers. When the images of the respective frames are printed onto a photographic printing paper, the photographic system utilizes the information recorded on the magnetic recording layers. In such a photographic system, a negative film for which developing processing has been completed is not cut into piece negatives of a plurality of frames (e.g., six frames), and instead, is again taken up into a cartridge so that the information recorded on the magnetic recording layers is not damaged.

In order to use, during printing, the information recorded on the negative film, it is necessary to provide a film carrier with functions for recording and reading magnetic information. Thus, many film carriers equipped with magnetic heads for recording and reading magnetic information have been proposed.

The magnetic information recorded on the negative film differs per negative film. Accurate recording of magnetic information and accurate reading of the recorded magnetic information are needed for each negative film.

In order to effect accurate recording and reading of magnetic information, the magnetism generated when the magnetic head for recording (the recording head) records magnetic information must not affect the reading of magnetic information by the magnetic head for reading (the reading head). Further, the recording head and the reading head must respectively be kept in close contact with the magnetic recording layers of the negative film.

Dust, dirt or the like may adhere to the surface of the negative film. When the recording head or the reading head is fit closely to a negative film to which dust or dirt has adhered, the dust or dirt is transferred to the recording head or to the reading head so that the ability of the recording head or the reading head to be fit closely to the magnetic recording layers of the negative film deteriorates. Accurate recording or reading of magnetic information thereby becomes difficult.

It is not easy to visually detect dirt which has adhered to a magnetic head or dirt which has adhered to the surface of a negative film which it is feared will sully a magnetic head. Further, repeatedly confirming whether the recording head accurately recorded information onto the negative film and whether the reading head accurately read the magnetic information of the negative film results in an increase in the number of parts and a deterioration in operational efficiency.

As a result, it is necessary to provide the film carrier with, for example, a reading head which reads the data recorded by the recording head so as to check whether the recording head is operating accurately.

However, the film carrier must frame-advance a negative film in order to print the images recorded on the negative film onto a photographic printing paper, and accordingly, the mounting positions of the reading head and the recording head are restricted. Further, providing a reading head for checking the data recorded by the recording head results in an increase in the number of parts. Moreover, when magnetic information is recorded while the negative film is frame-advanced, the mounting position of the reading head for checking is restricted, and the film carrier becomes larger than necessary.

SUMMARY OF THE INVENTION

In view of the aforementioned, an object of the present invention is to provide a method of checking magnetic heads and to provide a film carrier which, without providing a large number of magnetic heads, can check whether a recording head and a reading head are able to accurately record and read magnetic information.

A first aspect of the present invention is a method of checking magnetic heads for checking operation of a recording head, which records magnetic information onto magnetic recording layers of a photographic film, and of a reading head, which reads magnetic information recorded on the magnetic recording layers of the photographic film, the recording head and the reading head being provided at a film carrier in which a photographic film accommodated in a cartridge is conveyed reciprocally in a direction of being withdrawn from the cartridge and in a direction of being wound into the cartridge, and the photographic film is advanced by frames while being conveyed in one of the direction of being withdrawn and the direction of being wound such that images recorded on the photographic film are positioned at a predetermined exposure position, the method comprising the steps of: recording preset data for checking onto a magnetic recording layer by the recording head, while the photographic film is being conveyed in the direction of being withdrawn; and while the photographic film is being conveyed in the direction of being wound, reading the recorded data by the reading head, and comparing the read data with the data for checking.

In the method of checking magnetic heads of the first aspect of the present invention, data for checking is recorded on a predetermined position of the photographic film while the photographic film is being conveyed in the direction of being withdrawn. The recorded data is read while the photographic film is being conveyed in the direction of being wound. A determination is made as to whether both the recording head and the reading head can operate appropriately.

For example, if dirt has adhered to one of the recording head and the reading head such that proper recording or reading of magnetic information cannot be effected, the read data differs from the recorded data for checking. Therefore, it can be determined that the recording head and the reading head need to be cleaned.

A second aspect of the present invention is a film carrier comprising: conveying/positioning means for conveying a photographic film along a conveying path in a going direction and a returning direction, and for frame-advancing the photographic film while conveying the photographic film in one of the going direction and the returning direction so as to position the photographic film at a predetermined exposure position; a reading head provided on the conveying path and, while the photographic film is being conveyed, reading magnetic information recorded on magnetic recording layers of the photographic film; a recording head able to record magnetic information on the magnetic recording layers of the photographic film; magnetic head control means for effecting reading of magnetic information from the magnetic recording layers by the reading head when the photographic film is being conveyed in the going direction, and for effecting recording of magnetic information onto the magnetic recording layers by the recording head when the photographic film is being conveyed in the returning direction; and checking means for recording data for checking onto a predetermined magnetic recording layer when the photographic film is being conveyed in the going direction, and for reading the recorded data for checking when the photographic film is being conveyed in the returning direction, and comparing the read data with the recorded data for checking.

In the film carrier of the second aspect of the present invention, while the photographic film is being conveyed in the going direction, the reading head reads the magnetic information recorded on the magnetic recording layers of the photographic film. When the photographic film is being conveyed in the returning direction, the recording head records magnetic information.

While the photographic film is being conveyed in the going direction, the magnetic head checking means records the preset data for checking onto a predetermined position of a magnetic recording layer by the recording head. While the photographic film is being conveyed in the returning direction, the magnetic head checking means reads this data by the reading head. By comparing the read data with the data for checking, it can be confirmed whether both the recording head and the reading head are operating appropriately. There is no need to provide a reading head for checking the operating state of the recording head, and the operating state of the reading head can be verified as well.

Due to the processing of photographic films, dirt gradually adheres to the recording head and the reading head. The adhered dirt gradually comes to affect the operation of the recording head and the reading head. By checking the recording head and the reading head each time a photographic film is processed or each time a predetermined amount of photographic films are processed, the recording of magnetic information onto the photographic film and the reading of recorded magnetic information can be carried out accurately. In particular, if the recording head and the reading head are checked each time a photographic film is processed, poor operation thereof can be detected.

When the photographic film withdrawn from the cartridge is frame-advanced while being rewound (i.e., while being conveyed in the returning direction), when one of the image frames of the photographic film is disposed at the exposure position, the recording head may be disposed so as to be positioned between adjacent image frames at the downstream side of the exposure position in the returning conveying direction. When the photographic film is frame-advanced while being withdrawn from the cartridge (i.e., while being conveyed in the going direction), the reading head may be disposed so as to be positioned between adjacent image frames at the upstream side of the opening in the going conveying direction (the downstream side in the returning conveying direction).

In this way, the operating states of the recording head and the reading head can be checked without providing a magnetic head for checking. There is no need to provide a large number of magnetic heads, and therefore, a compact film carrier can be obtained.

A third aspect of the present invention is a method for checking magnetic heads which are respectively formed by a recording head and reading head pair, the recording head recording magnetic information onto a strip-shaped magnetic material which is being conveyed, and the reading head reading magnetic information from the strip-shaped magnetic material, the method comprising: recording data for checking on a predetermined position of a conveying direction leading end portion of the strip-shaped magnetic material by the recording head before processing of the strip-shaped magnetic material, and after the recording, reading data recorded on the strip-shaped magnetic material, by the reading head which is disposed at a downstream side of the recording head in a conveying direction of the strip-shaped magnetic material; and checking whether the recording head and the reading head are operating appropriately by comparing the read data and the data for checking.

In the third aspect of the present invention, before magnetic information is recorded onto the strip-shaped magnetic material or magnetic information is read from the strip-shaped magnetic material, data for checking is recorded by the recording head onto the conveying direction leading end portion of the strip-shaped magnetic material. Then, the data in the region in which the data for checking was recorded by the recording head is read by the reading head. By comparing the data for checking and the read data, it can be determined whether the recording head and the reading head are operating appropriately.

If dirt or the like has adhered to either the recording head or the reading head and accurate recording of data or accurate reading of data cannot be carried out, there will be a difference in the data read by the reading head and the data for checking. It can therefore be accurately determined whether the recording head and the reading head are operating appropriately.

In the fourth aspect of the present invention, in the third aspect of the present invention, the data for checking which is recorded on the strip-shaped magnetic material by the magnetic head is changed at a predetermined timing.

In the fourth aspect, the data for checking is changed at a predetermined timing so that recording of the same data for checking on a single strip-shaped magnetic material can be prevented. For example, in a state in which the recording head is not operating, when a strip-shaped recording material which has been checked previously is again checked, the previous data for checking which was recorded on the strip-shaped magnetic material is mistakenly read as the data for the present time, and any abnormality of the recording head (poor operation of the recording head) cannot be detected. In accordance with the fourth aspect, this drawback is prevented.

The data for checking may be changed each time a predetermined period of time elapses. The predetermined period of time may be a preset time such as one day, one hour or several hours. If the data for checking is changed each day, the date (year, month, date or month, date or the like), or a combination of the date and a random number or the like can be used as the data for checking. If the data for checking is changed every hour or every several hours, the date and time (year, month, date, time or month, date, time or the like), or a combination of the date and time and a random number or the like may be used as the data for checking.

The data for checking may be changed each time a predetermined number of checks has passed. In this case, the data for checking may be the time (hour and minute) or any of various combinations such as the date and the time, the time and a random number, the date and the time and a random number, or the like.

The data for checking may be changed each time a predetermined period of time passes and each time a predetermined number of checks is carried out. In this case as well, data generated by a combination of the date, time, a random number or the like can be used as the data for checking so that the data for checking is not the same.

In the fifth aspect of the present invention, in the method of checking magnetic heads of the fourth aspect, the data for checking recorded on the strip-shaped magnetic material by the recording head is changed each time writing onto the strip-shaped recording material is carried out by the recording head.

In the fifth aspect, the data for checking is changed at all times. In this way, even if one strip-shaped magnetic material is checked repeatedly, reading of the data for checking recorded the previous time as the data for the present time can reliably be prevented.

In the sixth aspect of the present invention, in any of the methods for checking magnetic heads of the third through the fifth aspects, the length, along the conveying direction of the strip-shaped magnetic material, of the portion of the strip-shaped magnetic material on which data for checking is written is shorter than an interval, along the conveying direction of the strip-shaped magnetic material, between the position of recording by the recording head and the position of reading by the reading head.

In the sixth aspect, the data amount of the data for checking is set so that the recording of the data for checking by the recording head is completed by the time the leading end of the data for checking recorded on the strip-shaped magnetic material reaches the position at which the magnetic information is read by the reading head. In this way, simultaneous operation of the recording head and the reading head can be prevented. Therefore, even if the recording head and the reading head are disposed in close proximity, magnetism from the recording head does not affect the operation of the reading head, and accurate reading of the data is possible.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The invention will now be described with reference to the accompanying drawings wherein:

FIG. 5A is a plan view illustrating a schematic structure of a negative film which is loaded at the film carrier;

FIG. 5B is a schematic plan view illustrating a state in which a portion of the negative film has been withdrawn from a cartridge;

FIG. 6 is a schematic plan view illustrating relative positions of an opening on a conveying path, sensors, and magnetic head portions of the film carrier;

FIG. 7 is a flowchart illustrating an example of magnetic head portion checking;

FIG. 10 is a flowchart illustrating an example of magnetic head checking in accordance with the second embodiment of the present invention.

DESCRIPTION OF THE PREFERRED EMBODIMENTS

Figure 1:
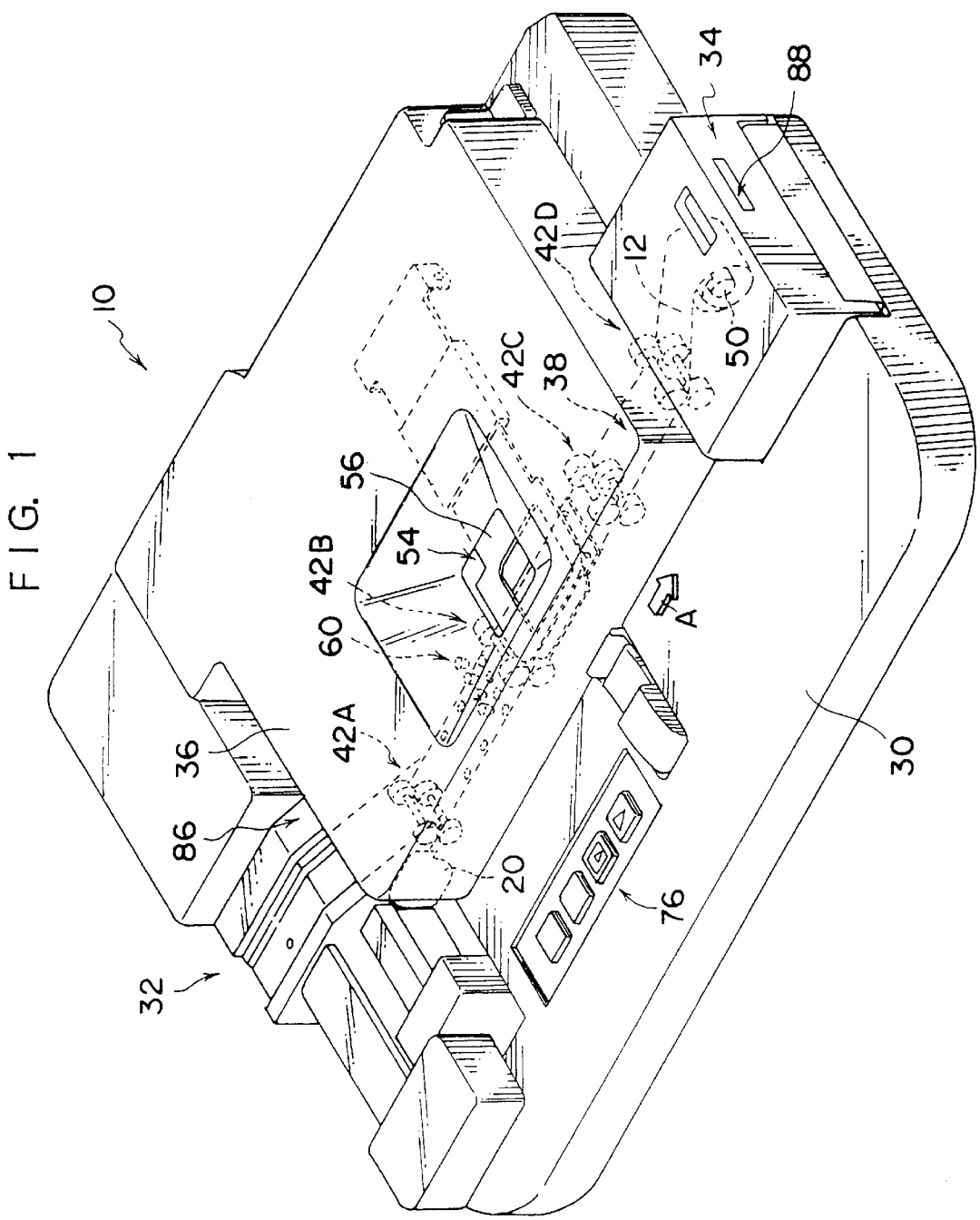
FIG. 1 is a schematic perspective view illustrating a film carrier applied to the present embodiment.
Figure 2:
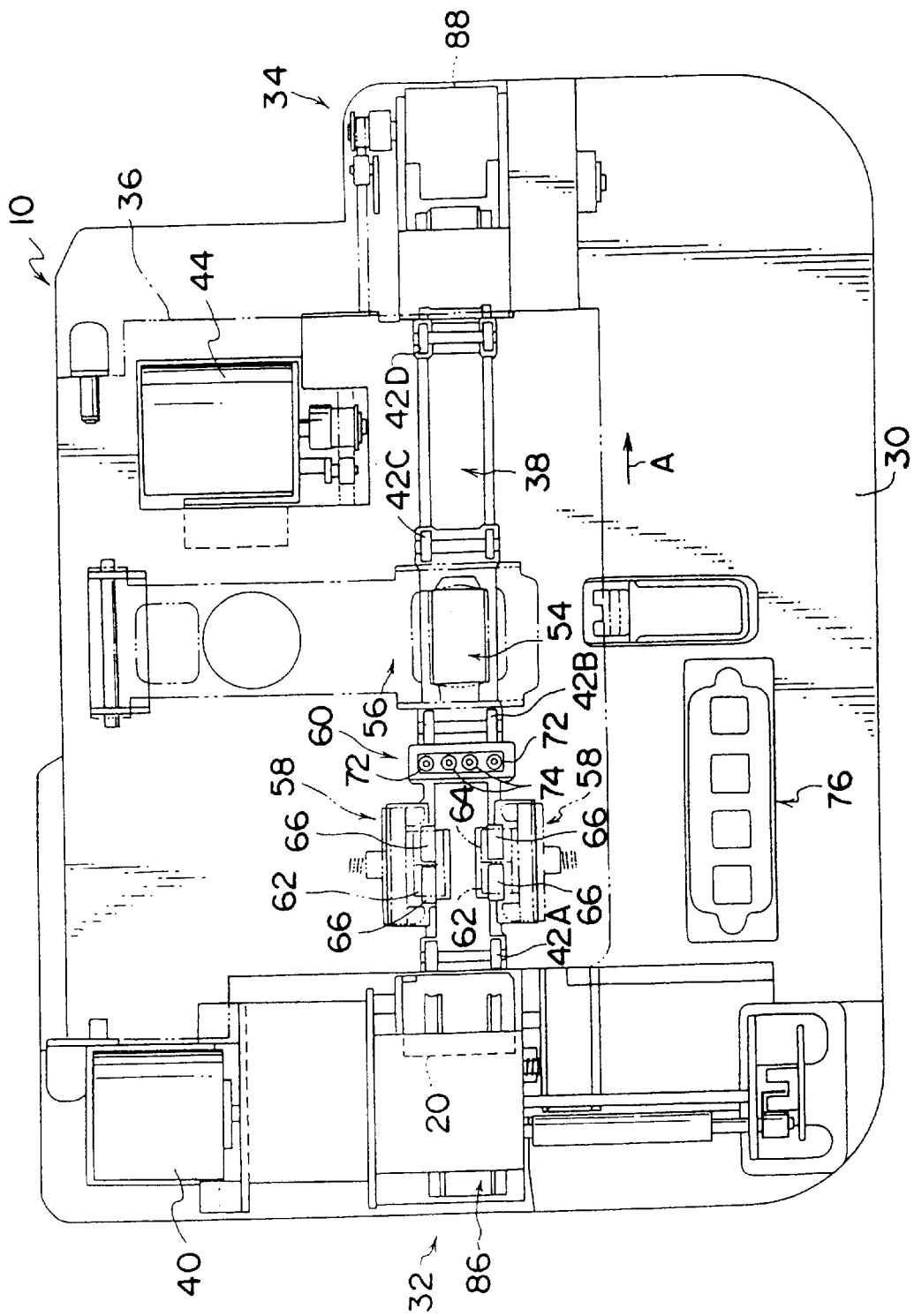
FIG. 2 is a plan view of principal parts illustrating a base stand of the film carrier.
Figure 3:
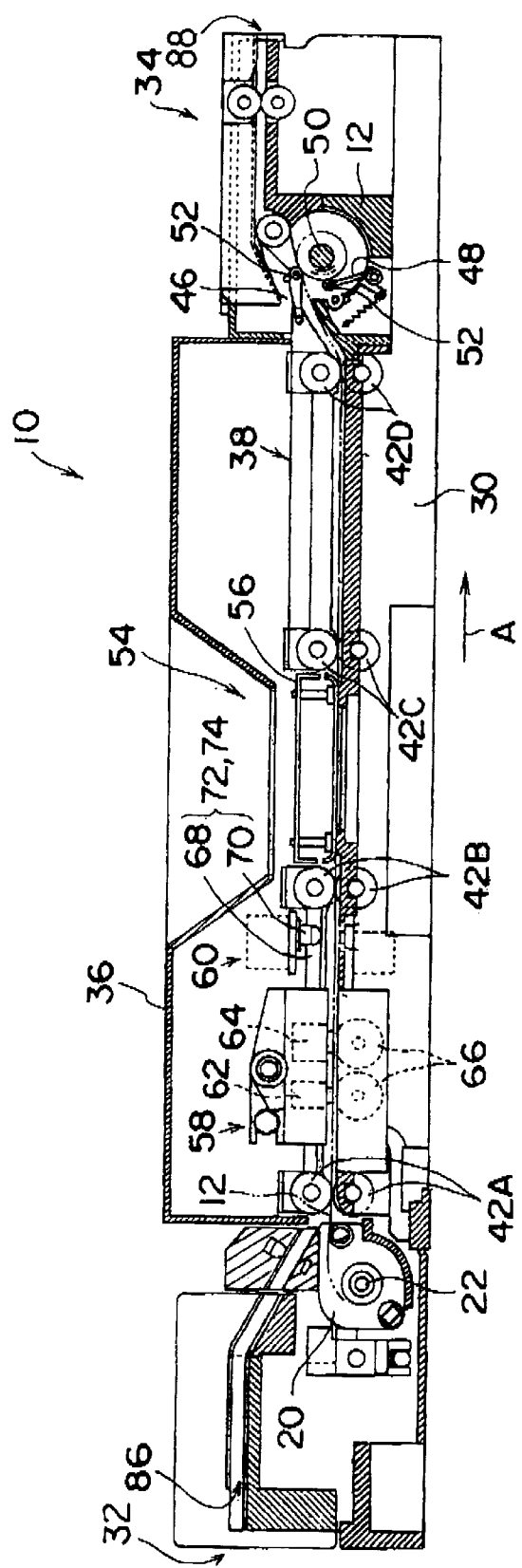
FIG. 3 is a schematic sectional view of the film carrier along a conveying direction of a negative film.

FIGS. 1 through 3 illustrate a film carrier 10 applied to the present embodiment. The film carrier 10 is mounted to a photographic printer such as the printer section of an unillustrated printer processor or the like, and is used in printing onto a photographic printing paper the images recorded on the respective image frames of a photographic film (hereinafter, "negative film 12" is used as an example of the photographic film). The photographic printing paper on which the images are printed is subjected to a series of processings such as color developing, bleaching/fixing, rinsing, drying and the like. The photographic printing paper is then cut into the printed images such that photographic prints are formed.

As illustrated in FIGS. 5A and 5B, the negative film 12 loaded at the film carrier 10 is structured by a leader portion 14, an image recording portion 16, and a tail portion 18. The tail portion 18 of the negative film 12 engages with a spool shaft 22 of a cartridge 20. The negative film 12 is taken up in layers onto the spool shaft 22 and is accommodated in the cartridge 20. Further, image frames 16A, on which images are recorded by photographing or the like, are formed in the image recording portion 16 so as to be spaced apart at predetermined intervals.

Perforations 24 are formed in the image recording portion 16 of the negative film 12 at predetermined intervals along the longitudinal direction of the negative film 12 in one transverse direction end thereof. Each perforation 24 corresponds to an image frame 16A. The positions of the image frames 16A can be accurately known from the positions of the perforations 24. Around perforations 14A, 18A are formed at the image recording portion 16 sides of the leader portion 14 and the tail portion 18, respectively. Further, a detach perforation 18B which indicates the trailing end position of the negative film 12 is formed in the tail portion 18. A notch 14B is formed in the leading end portion of the leader portion 14.

Magnetic recording layers, on which magnetic information is recorded, are provided at both transverse end portions of the negative film 12 so that magnetic information can be recorded on both transverse direction end portions from the leader portion 14 to the tail portion 18. The spaces between adjacent perforations 24 in the image recording portion 16 are used for magnetic tracks 26 for recording magnetic information. Information relating to the negative film 12, information at the time of photographing the images of the image frames 16A, and the like is recorded on the magnetic tracks 26. Further, exposure conditions at the time of printing each image onto the photographic printing paper or the like can be recorded on the magnetic tracks 26. A substantially transparent magnetic recording layer may be provided over the entire surface of the negative film 12 so as to form a strip-like magnetic material, and portions thereof may be used as the magnetic tracks 26.

As illustrated in FIGS. 1 through 3, the film carrier 10 in which the negative film 12 is loaded is provided with a base stand 30, a cartridge loading portion 32, a film accommodating portion 34 and a cover 36 which covers the top surface of the base stand 30. A conveying path 38, which connects the cartridge loading portion 32 and the film accommodating portion 34, is formed in the upper surface of the base stand 30. The conveying path 38 is usually covered by the cover 36.

The cartridge 20 which houses the developed negative film 12 is loaded at the cartridge loading portion 32. Due to the driving of a motor 40 (see FIG. 2), the spool shaft 22 is rotated, and the negative film 12 is sent out from the cartridge 20 onto the conveying path 38. By driving the motor 40 reversely, the negative film 12 which has been delivered out is taken up onto the spool shaft 22 and is accommodated in the cartridge 20.

The conveying path 38 includes feed rollers 42A through 42D which are provided in pairs at the base stand 30 and the cover 36. Due to the driving of a motor 44 (see FIG. 2), the negative film 12 is nipped by the feed rollers 42A through 42D, and is conveyed in a direction of being withdrawn from the cartridge 20 (the direction of arrow A in the figures) and in a direction of being sent into the cartridge 20 (in the direction opposite to the direction of arrow A).

As illustrated in FIG. 3, in the film accommodating portion 34, the negative film 12 which has passed through the conveying path 38 and been conveyed in is guided along the peripheral surface of a take-up shaft 50 by guides 46, 48. The negative film 12 is nipped between the take-up shaft 50 and guide rollers 52, which are provided at the distal ends of the guides 46, 48, so that the negative film 12 is wound on the take-up shaft 50. In this way, the negative film 12 is temporarily accommodated. Even if the negative film 12 has a tendency to curl, the negative film 12 can be prevented from twisting around and becoming damaged.

In the cartridge loading portion 32, before the negative film 12 is delivered out to the conveying path 38, it is confirmed whether the negative film 12 accommodated in the cartridge 20 has been developed. In this way, inadvertent withdrawal and photosensitizing of an undeveloped negative film 12 can be prevented.

An opening 54 for printing is formed in the central portion of the conveying path 38 in the film carrier 10. The respective image frames 16A of the negative film 12 are successively positioned at the opening 54. A light beam illuminated from an unillustrated light source beneath the base stand 30 passes through the opening 54, is transmitted through the positioned negative film 12, and forms an image onto the photographic printing paper by an unillustrated optical system. In this way, the images recorded on the negative film 12 are printed onto the photographic printing paper. A negative pressing plate 56 is provided between the base stand 30 and the cover 36. When the negative film 12 is positioned with respect to the opening 54, the periphery of the image of the negative film 12 is pressed uniformly between the base stand 30 and the negative pressing plate 56 so that there will be no distortion or the like of the image printed onto the photographic printing paper.

As illustrated in FIGS. 2 and 3, magnetic head portions 58 and a sensor portion 60 are provided in the film carrier 10. The magnetic head portion 58 includes a recording head 62, which writes magnetic information, and a reading head 64, which reads written magnetic information. The magnetic head portions 58 are mounted to the cover 36 so as to oppose the transverse direction end portions of the conveying path 38. Back up rollers 66 are provided at the base stand 30 so as to oppose the recording head 62 and the reading head 64. The back up rollers 66 make the magnetic recording layers at the transverse direction end portions of the negative film 12 conveyed along the conveying path 38 fit tightly to the recording head 62 and the reading head 64.

As shown in FIG. 6, the magnetic head portions 58 are disposed between the opening 54 of the conveying path 38 and the cartridge loading portion 32. The recording heads 62 are mounted so as to be located between adjacent image frames 16A at the cartridge loading portion 32 side of the opening 54 (the left side of the opening 54 in FIG. 6) when any of the image frames 16A of the negative film 12 is positioned at the opening 54. The reading heads 64 are mounted at the opening 54 sides of the recording heads 62.

As a result, when the negative film 12 is being frame-advanced, the magnetic tracks 26 of the negative film 12 move at a constant speed while contacting the recording heads 62, so that the recording of magnetic information onto the magnetic tracks 26 is possible. Further, when the negative film 12 is conveyed continuously at a constant speed without being frame-advanced, the recording and reading of magnetic information onto and from the magnetic tracks 26 by the recording heads 62 and the reading heads 64 is possible.

As shown in FIG. 3, the sensor portion 60 is disposed between the opening 54 and the magnetic head portions 58, and is equipped with a plurality of sensors 72, 74 respectively formed by a light emitting portion 68 and a light receiving portion 70. One of the light emitting portion 68 and the light receiving portion 70 of the sensors 72, 74 is provided at the cover 36, whereas the other of the light emitting portion 68 and the light receiving portion 70 is provided at the base stand 30.

As illustrated in FIGS. 2 and 6, the sensors 72 are disposed so as to oppose the transverse direction end portions of the conveying path 38. The sensors 72 detect the perforations 24, the around perforations 14A, 18A, the notch 14B, the detach perforation 18B, and the leading end and the trailing end of the negative film 12. When optical information such as a bar coded DX code or the like is recorded on the transverse direction end portions of the negative film 12, this optical information can also be read. Further, the sensors 74 are disposed along the transverse direction of the conveying path 38, and detect the images of the negative film 12 passing along the conveying path 38.

Figure 4:
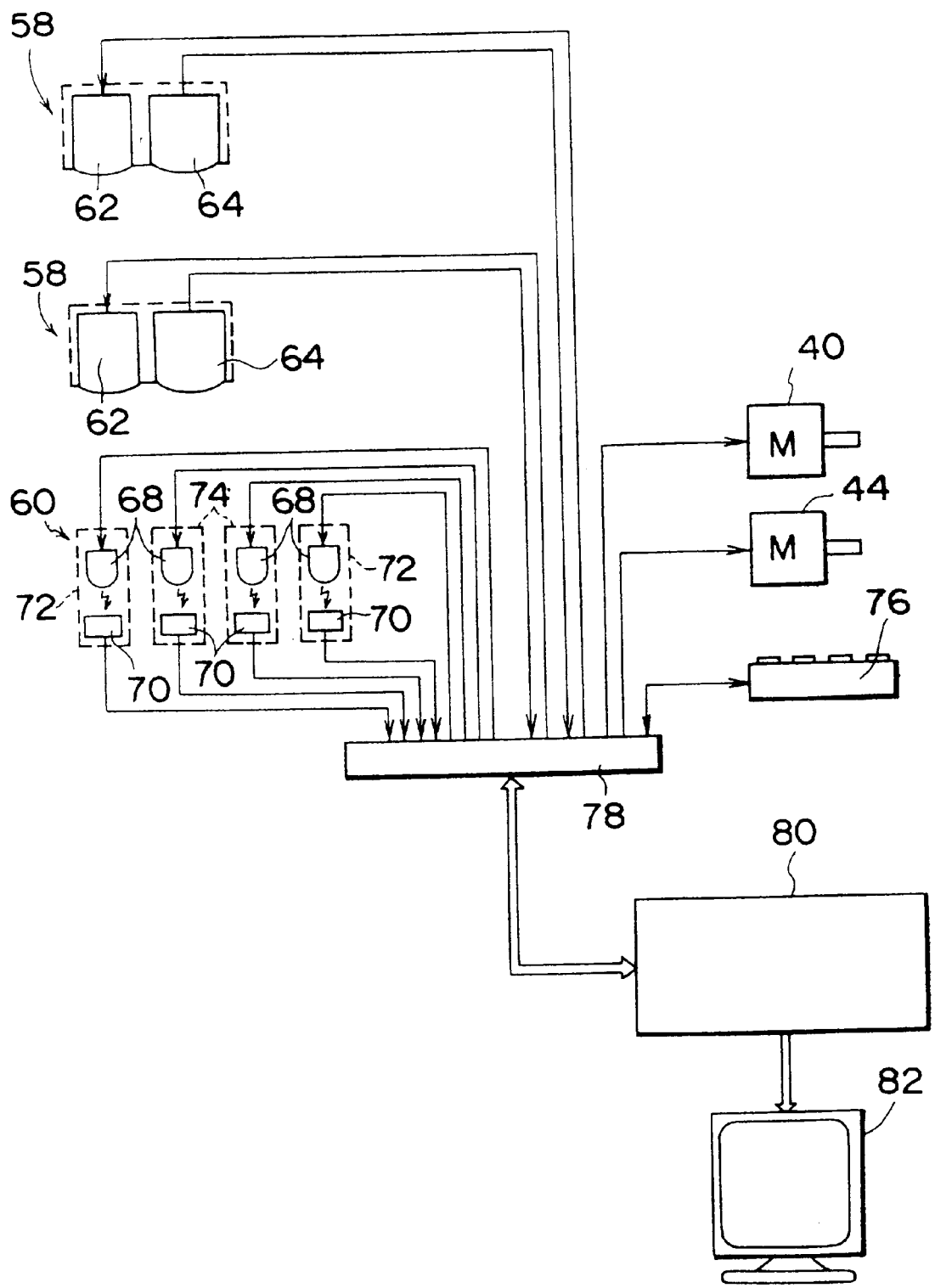
FIG. 4 is a block diagram illustrating a control system of the film carrier.

As shown in FIG. 4, the magnetic head portions 58 and the sensor portion 60 of the film carrier 10, together with the motors 40, 44 and an operation switch 76 (see FIG. 1), are connected to a print controller 80 via a connector 78. The print controller 80 is provided with an unillustrated microcomputer having a CPU, ROM, RAM and the like. The print controller 80 controls printing processing at the time when the images recorded on the negative film 12 are printed onto a photographic printing paper at an unillustrated printer processor.

At the print controller 80, the magnetic information recorded on the magnetic tracks 26 is read by the reading heads 64 when the negative film 12 is conveyed at a constant speed in the direction of arrow A toward the film accommodating portion 34 while being withdrawn from the cartridge 20 in the cartridge loading portion 32.

When the negative film 12 accommodated in the film accommodating portion 34 is taken up into the cartridge 20, the print controller 80 frame-advances the negative film 12, and positions each image frame successively at the opening 54, and effects exposure. At this time, the exposure conditions, the exposure size and the like are set on the basis of the read magnetic information. Each time exposure is completed while the negative film 12 is being frame-advanced, the print controller 80 records magnetic information onto the magnetic tracks 26.

While the negative film 12 is being conveyed so as to be withdrawn from and rewound onto the cartridge 20, the print controller 80 confirms the operating states of the recording heads 62 and the reading heads 64 of the magnetic head portions 58. The confirmation of the operating states of the magnetic head portions 58 by the print controller 80 is carried out in the following manner: when the negative film 12 is withdrawn from the cartridge 20 and temporarily taken up into the film accommodating portion 34, data for checking, which is set in advance and recorded, is written by the recording heads 62 on preset positions of the negative film 12 which do not affect the magnetic information recorded on the negative film 12.

As illustrated in FIG. 5A, the position at which the data for checking is written may be a predetermined position between the notch 14B and the around perforation 14A of the leader portion 14, or may be a predetermined position between the around perforation 18A and the detach perforation 18B of the tail portion 18. More specifically, a position which does not affect the magnetic information recorded on the negative film 12 can be used as a checking track 28. The positions of the checking tracks 28 can be determined from the positions of the notch 14B, the around perforations 14A, 18A, or the detach perforation 18B, which positions are detected by the sensors 72.

When the negative film 12 is taken up into the cartridge 20, the data recorded on the checking tracks 28 is read by the reading heads 64, and the print controller 80 confirms whether there is a difference between the read data and the recorded data.

Here, when a portion of the read contents differs from the recorded contents, the print controller 80 determines that dirt has adhered to the recording heads 62 and/or the reading heads 64. The print controller 80 displays a notice that the recording heads 62 and the reading heads 64 of the magnetic head portions 58 should be cleaned, on a display device 82, such as a CRT display for print operation, which is provided at the printer processor. Further, when the predetermined data cannot be read, by display on the display device 82, notification is given that there is an abnormality in the operation of the magnetic head portions 58 and that exposure operation should be discontinued and the magnetic head portions 58 inspected.

As illustrated in FIGS. 1 through 3, in the film carrier 10, a film insertion opening 86 is provided at the cartridge loading portion 32 and a film discharge opening 88 is provided at the film accommodating portion 34. In this way, processing of negative films 12 which are not accommodated in cartridges 20, i.e., so-called "strips", is also possible.

Operation of the present embodiment will now be described.

At the film carrier 10, when the cartridge 20 is loaded in the cartridge loading portion 32 and instructions are given to begin exposure operation of the negative film 12, the spool shaft 22 is rotated due to the driving of the motor 40, and the negative film 12 is delivered out from the cartridge 20. Further, the feed rollers 42A through 42D and the take-up shaft 50 of the film accommodating portion 34 are rotated by the motor 44. The negative film 12 is withdrawn from the cartridge 20 and conveyed at a constant speed, and is sent into the film accommodating portion 34 and temporarily taken up onto the take-up shaft 50.

At this time, in the film carrier 10, the magnetic information recorded on the magnetic tracks 26 of the negative film 12 is read by the reading heads 64 of the magnetic head portions 58, and the optical information recorded on the negative film 12 is also read. The magnetic information and the optical information are outputted to the printer processor.

Next, in the film carrier 10, the motors 40, 44 are driven reversely so that the negative film 12 is withdrawn from the film accommodating portion 34 and is taken-up into the cartridge 20 while being frame-advanced. At this time, at the print controller 80, the perforations 24 provided so as to correspond to the respective image frames 16A are detected by the sensors 72, and each image frame 16A is positioned successively at the opening 54. The image recorded on the image frame 16A is printed onto the photographic printing paper on the basis of the read magnetic information.

Further, the print controller 80 records onto the magnetic tracks 26 magnetic information corresponding to the images for which printing has been completed.

At the print controller 80, the operating states of the recording heads 62 and the reading heads 64 of the magnetic head portions 58 are checked in parallel with the exposing of the images recorded on the negative film 12 onto the photographic printing paper.

FIG. 7 illustrates an example of the checking of the magnetic head portions 58 by the print controller 80, which will be described hereinafter with reference to this flowchart. The flowchart in FIG. 7 is implemented for each of the magnetic head portions 58 provided at the conveying transverse direction sides of the negative film 12.

In first step 100 of the flowchart, a determination is made as to whether processing of the negative film 12 at the film carrier 10 has begun. When the motors 40, 44 are driven and the withdrawal of the negative film 12 from the cartridge 20 begins, the routine proceeds to subsequent step 102, where it is confirmed whether the notch 14B formed in the leader portion 14 of the negative film 12 has been detected by the sensor 72.

When the sensor 72 detects the notch 14B (i.e., when the answer to the determination in step 102 is affirmative), writing of the data for checking onto the checking tracks 28 is carried out (step 104) at the time at which it is judged from the amount of driving of the motor 44 that the checking tracks 28 are positioned at the recording heads 62 of the magnetic head portions 58.

When checking of the magnetic head portions 58 is carried out by using the tail portion 18 of the negative film 12, writing of the data for checking may be carried out after the sensor 72 detects the around perforation 18A.

In subsequent step 106, it is confirmed whether rewinding of the negative film 12 has begun. When the answer to this determination is affirmative, it is next confirmed whether the around perforation 14A has been detected by the sensor 72. Here, when the around perforation 14A has been detected (i.e., when the answer to the determination in step 108 is affirmative), the position of the checking tracks 28 is confirmed from the position of the around perforation 14A, and the magnetic information recorded on the checking tracks 28 is read by the reading heads 64 (step 110).

In subsequent step 112, the data of the checking tracks 28 read by the reading heads 64 and the data for checking recorded by the recording heads 62 are compared.

In next step 114, a determination is made as to whether the read data and the data for checking match. When the data match, the flowchart ends.

When the read data of the checking tracks 28 and the data for checking do not match, the routine proceeds to step 116, where a predetermined display is carried out at the display device 82 (error processing).

When portions of the read data and the data for checking do not match, it can be surmised that dirt or the like has adhered to the recording head 62 or the reading head 64. Therefore, the display device 82 displays that the magnetic head portions 58 should be cleaned.

Due to the recording heads 62 and the reading heads 64 of the film carrier 10 contacting the negative film 12, the dust, dirt or the like on the surface of the negative film 12 adheres to the recording heads 62 and the reading heads 64, and they gradually become dirty. Due to such dirt, it is difficult for the recording heads 62 to accurately record magnetic information and for the reading heads 64 to accurately read magnetic information.

The print controller 80 determines whether or not portions of the data for checking could be recorded accurately or the recorded data could be read accurately due to dirt adhering to the recording heads 62 and the reading heads 64. In cases in which the print controller 80 determines that recording or reading cannot be carried out accurately, the print controller 80 advises that the recording heads 62 and the reading heads 64 of the magnetic head portions 58 should be cleaned. In this way, the magnetic head portions 58 of the film carrier 10 can always operate appropriately.

When magnetic information cannot be read from the checking tracks by the reading heads 64, it can be assumed that there is some trouble with the recording head 62 or the reading head 64. It can therefore further be assumed that the recording of magnetic information onto the magnetic tracks 26 of the negative film 12 or the reading of magnetic information from the magnetic tracks 26 was not carried out accurately. Therefore, the print controller 80 may have the display device 82 display that the magnetic head portions 58 should be inspected and that exposure operation must be discontinued.

In the film carrier 10 in which the recording heads 62 and the reading heads 64 are provided in pairs, data for checking is recorded by the recording heads 62 on predetermined positions of the negative film 12. The recorded data is read by the reading heads and compared, and it is determined whether the magnetic head portions 58 can operate appropriately. In this way, there is no need to provide reading heads for confirming the operation of the recording heads 62 separately from the reading heads 64 which read the magnetic information recorded on the negative film 12. An increase in the number of parts of the film carrier 10 and an increase in the size of the film carrier 10 can thereby be suppressed. Further, the operating states of the recording heads 62 and the reading heads 64 can be confirmed collectively.

The present embodiment illustrates an example of the present invention, and the present invention is not limited to this embodiment. For example, in the film carrier 10, the checking of the magnetic head portions 58 is carried out by the print controller 80 which is provided in an unillustrated printer processor. However, this function may be provided in the film carrier 10 itself.

Moreover, in the present embodiment, when the negative film 12 is being conveyed in the returning direction (i.e., when the negative film 12 is being rewound into the cartridge 20 after having been temporarily wound in the film accommodating portion 34), the negative film 12 is conveyed by being advanced per frame (frame-advanced). However, the negative film 12 may also be frame-advanced in the going direction (i.e., when being conveyed and wound into the film accommodating portion 34). In this case, when an image frame 16A of the negative film 12 is positioned, the reading heads 64 may be positioned between adjacent image frames 16A at the upstream side in the going direction, and the recording heads 62 may be disposed adjacent to the reading heads 64, or may be disposed so as to be separated from the reading heads 64 on the side of the opening 54 opposite the side at which the reading heads 64 are disposed (i.e., the recording heads 62 may be disposed at the film accommodating portion 34 side of the opening 54).

The present invention may be applied to a photographic printing system which is equipped with a function for preparing an index print in which the images recorded on one roll of negative film 12 are arranged in a matrix form and which is used to confirm the images recorded on the negative film 12 at a glance.

In this case, the following structure may be employed. The printer processor is equipped with an image reading device such as a scanner, an analyzer or the like. First, the negative film 12 is conveyed from the cartridge 20 at a constant speed, and the magnetic information of the negative film 12 is read by the reading heads 64. Simultaneously, reading of the images recorded on the respective image frames is carried out by the image reading device. At this time, the data for checking is recorded on predetermined positions of the negative film 12 (on the checking tracks 28 or the like) by the recording heads 62. Next, when the negative film 12 is frame-advanced in order to expose the images of the negative film 12 onto the photographic printing paper, the data recorded by the recording heads 62 is read by the reading heads 64.

When the negative film 12 is conveyed at least twice along a predetermined conveying path at which the magnetic head portions 58 are provided, the operating states of the recording heads and the reading heads may be confirmed as follows. During the first conveying, the data for checking is recorded by the recording heads 62 onto predetermined positions of the negative film 12. When the negative film 12 is conveyed the next time along the conveying path, the data recorded by the recording heads 62 is read by the reading heads 64 and compared with the data for checking.

In this way, the negative film 12 in a strip form can be processed at the film carrier 10. In this case, when the strip negative film 12 is initially inserted and conveyed at a constant speed and the magnetic information thereof is read, the data for checking is recorded. Then, when the negative film 12 is inserted and frame-advanced, the data recorded previously may be read and compared.

In the embodiment described above, by recording data for checking when a photographic film is being conveyed in the going direction and reading this data when the film is being conveyed in the returning direction, it can be confirmed whether the magnetic head portions are in appropriate operating states. Therefore, there is no need to provide a reading head for confirming the operation of the recording head, and an increase in the number of parts and in the size of the film carrier can be suppressed. Further, the operation of the recording heads and the reading heads can be confirmed accurately, so that the magnetic head portions of the film carrier can be maintained in appropriate operating states.

Next, a second embodiment of the present invention will be described with reference to FIGS. 1 through 6 and FIGS. 8 through 10. The structure of FIGS. 1 through 6 is the same as in the first embodiment, and accordingly, description thereof will be omitted.

Figure 8A:
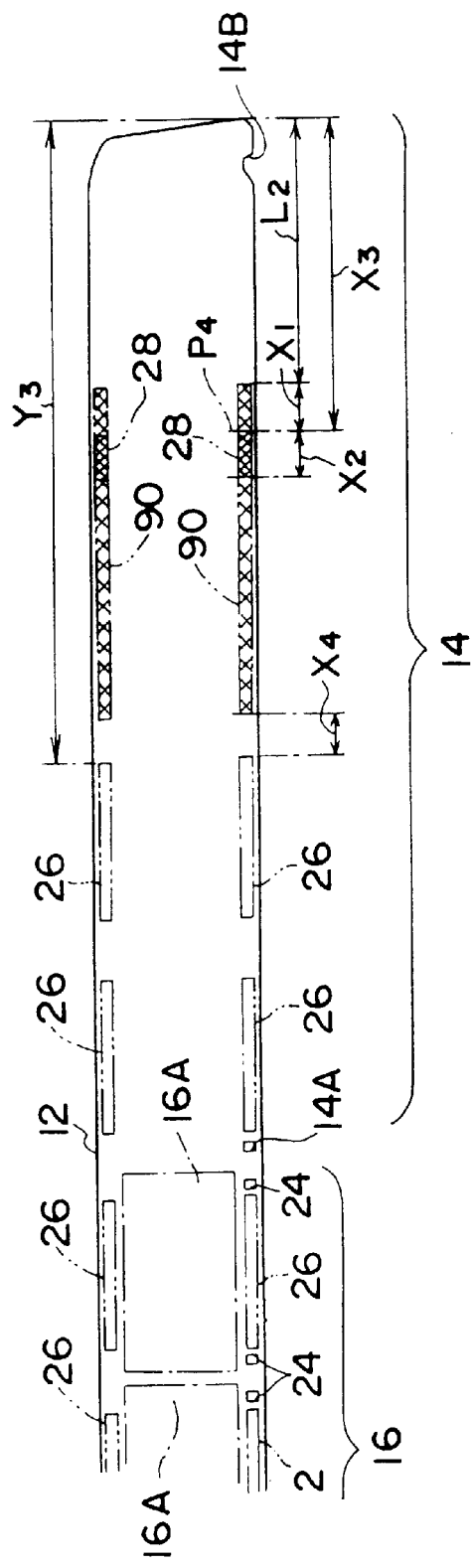
FIG. 8A is a plan view of principal parts illustrating a leader portion of a negative film relating to a second embodiment of the present invention.
Figure 8B:
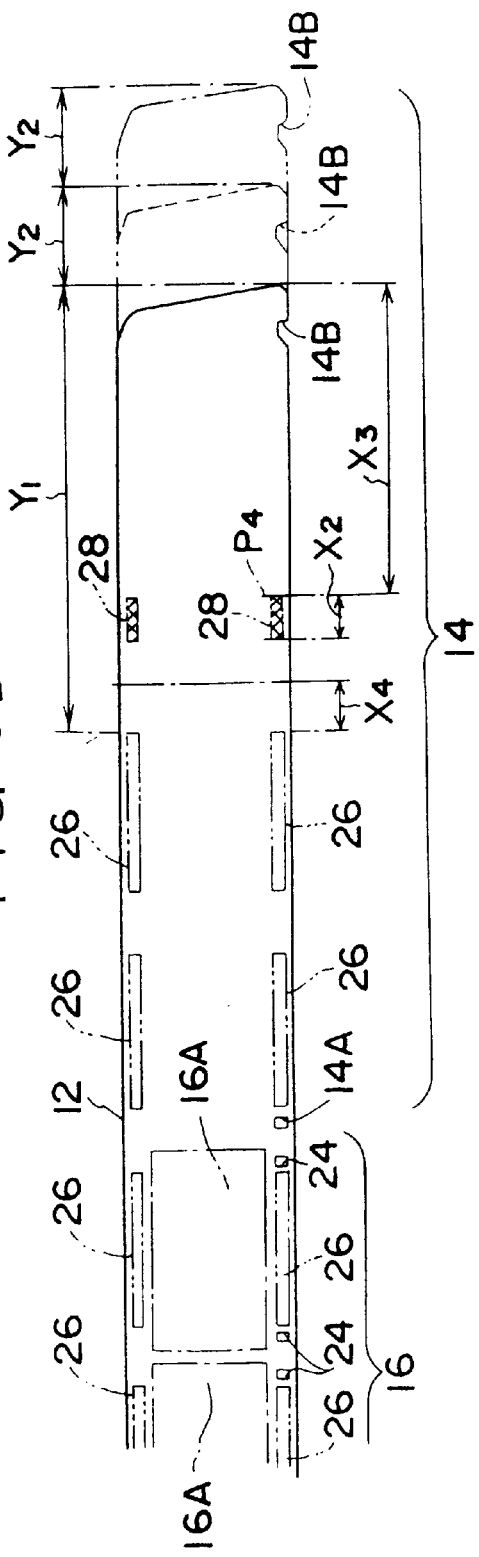
FIG. 8B is a plan view of principal parts illustrating a leader portion whose leading end portion has been cut.

As illustrated in FIGS. 8A and 8B, the magnetic tracks 26, which are the same as those of the image forming portion 16, are provided at the image forming portion 16 side of the leader portion 14 of the negative film 14. (Although the magnetic tracks 26 are also provided on the tail portion 18, illustration and description thereof is omitted.) Information relating to the negative film 12 is recorded on the magnetic tracks 26 of the leader portion 14.

In the negative film 12, the leading end of the leader portion 14 and/or the trailing end of the tail portion 18 may become damaged, or the configuration of the leading end may deform or be damaged, or the notch 14B, the detach perforation 18B, or an engagement hole provided in the tail portion 18 for engagement with the spool shaft 22 may deform or be damaged. In such a case, the leading end and/or the trailing end may be cut to predetermined lengths. For example, as illustrated in FIG. 8B, the leader portion 14 is cut, from the leading end thereof within a range of a predetermined length, and the remaining leading end is processed to the original configuration including the notch 14B. In this way, problems in the processing of the negative film 12 can be averted.

More specifically, in the leader portion 14 of the negative film 12, a minimum dimension $Y_1$ from the magnetic tracks 26 to the leading end should be maintained. For example, if the dimension $Y_2$ of one cutting is 14 mm, the leading end of the leader portion 14 can be cut and processed up to two times. The dimension $Y_3$ in FIG. 8A is the length from the end of the magnetic tracks 26 of the leader portion 14 to the initial leading end of the negative film 12 (i.e., at the time the manufactured film was shipped and before the film is cut and processed). Namely, $Y_3 = Y_2 \times 2 + Y_1$.

As illustrated in FIG. 6, the distance between the detecting positions of the sensors 72, 74 and a head position $P_1$ at which the recording heads 62 contact the negative film 12 is interval dimension $L_2$. Further, the distance between the head position $P_1$ of the recording heads 62 and a head position $P_2$, at which the reading heads 64 contact the negative film 12 when reading magnetic information therefrom, is head gap dimension $L_1$. In the film carrier 10, usually, the reading of the magnetic information recorded on the negative film 12 and the recording of magnetic information onto the negative film 12 are carried out at separate timings, so that the recording heads 62 and the reading heads 64 can be disposed in close proximity. In this way, an increase in the size of the film carrier 10 caused by separating the recording heads 62 and the reading heads 64 by a large distance can be prevented. More specifically, the film carrier 10 is operated such that the magnetism generated when the recording heads 62 are operating does not affect the operation of the reading heads 64. Therefore, the head gap dimension $L_1$ can be made small, and the recording heads 62 and the reading heads 64 can be disposed in close proximity to one another. In the film carrier 10, the head gap dimension $L_1$ is set to, for example, 13 mm.

When the negative film 12 is withdrawn from the cartridge 20 in the film carrier 10, the optical information recorded on the negative film 12 and the magnetic information recorded on the magnetic tracks 26 of the negative film 12 are read by the sensors 72 of the sensor portion 60 and the reading heads 64 of the magnetic head portions 58, and are outputted to the printer processor. The exposure conditions, the exposure size and the like for each image can be set from this information.

The controller 80 of the film carrier 10 checks whether the recording heads 62 and the reading heads 64 are operating normally, before the reading of the magnetic information recorded on the magnetic tracks 26 of the negative film 12 when the negative film 12 is withdrawn from the cartridge 20.

The checking of the recording heads 62 and the reading heads 64 is effected as follows. When the leading end of the negative film 12 being withdrawn from the cartridge 20 is detected by the sensors 72, preset data for checking is recorded onto the negative film 12. Next, when the region at which this data for checking is recorded opposes the reading heads 64, the reading heads 64 read the data recorded on the negative film 12. The data read by the reading heads 64 is compared with the data for checking, and it is determined whether the recording heads 62 and the reading heads 64 are operating normally. More specifically, in the film carrier 10, predetermined positions of the leader portions 14 illustrated in FIGS. 8A and 8B are used as the checking tracks 28, and the operating states of the recording heads 62 and the reading heads 64 of the magnetic head portions 58 are checked before the negative film 12 is processed.

The checking tracks 28 are provided at regions of the leader portion 14 which contact the recording heads 62 and the reading heads 64 before the magnetic tracks 26, and at which the recording heads 62 cannot damage the information recorded on the magnetic tracks 26 of the negative film 12. The checking tracks 28 are provided at blank regions 90 which extend from positions (i.e., positions which are at the interval dimension $L_2$ from the leading end) where the recording heads 62 contact when the sensors 72 detect the leading end of the negative film 12 (the leading end of the leader portion 14), to the leading ends of the magnetic tracks 26. The blank regions 90 illustrated in FIG. 8A are separated by a distance $X_4$ from the magnetic tracks 26 of the leader portion 14.

There is the possibility that the leader portion 14 of the negative film 12 will be cut and shortened. Even if the leader portion 14 is shortened, a track length $X_2$ of the checking tracks 28, which is determined by a position $P_4$ which is the start of writing the data for checking and by the amount of the data for checking, is set such that the checking tracks 28 do not overlap on the magnetic tracks 26 of the leader portion 14.

As a result, as illustrated in FIG. 8A, the recording of the data for checking by the recording heads 62 begins (start position $P_4$) when the leading end of the negative film 12 pulled out from the cartridge 20 is conveyed a length $X_1$ from the detection thereof by the sensors 72 and the position of the distance $X_3$ ($X_3 = X_1 + L_2$) from the leading end of the negative film 12 opposes the head position $P_1$ of the recording heads 62.

The data amount of the data for checking, i.e., the track length $X_2$ of the checking tracks 28 is $X_2 < L_1$, and the recording of the data for checking is completed before the start position $P_4$ on the negative film 12 reaches the head position $P_2$ of the reading heads 64. In this way, starting of the reading of data from the checking tracks 28 by the reading heads 64 while the data for checking is being recorded by the recording heads 62 can be prevented.

When the above described values are the minimum dimension $Y_1$ of the leader portion 14=66.1 mm, the distance $X_4$ =6 mm, and the interval dimension $L_2$ between the sensors 72 and the recording heads 62=38.8 mm, if the distance $X_3$ from the leading end of the negative film 12=45 mm, recording of data for checking having a track length $X_2$ of 13 mm or less ($X_2 < L_1$) is possible with sufficient leeway.

Figure 9A:
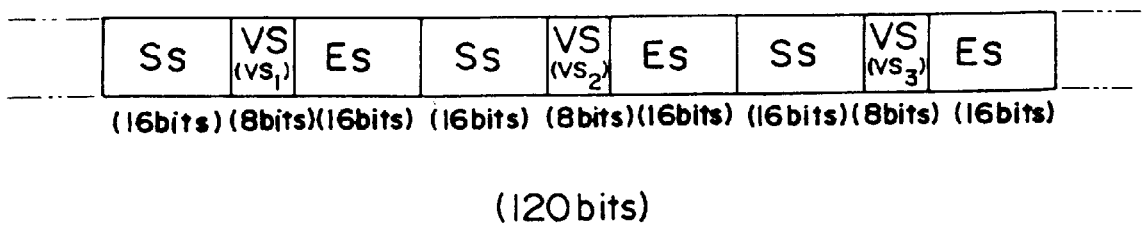
FIG. 9A is a frame structural view illustrating an example of data for checking which has been written by a recording head.
Figure 9B:
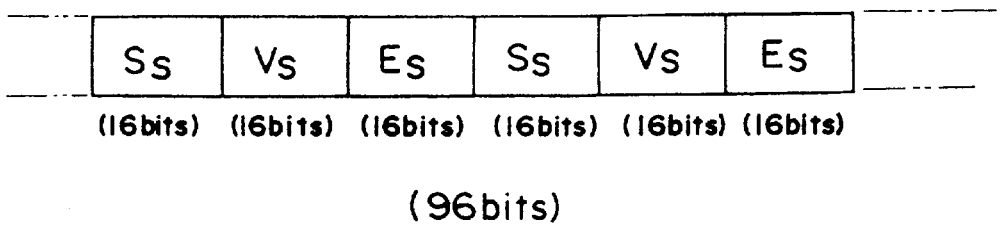
FIG. 9B is a frame structural view illustrating an example of data for checking which has been written by a recording head.

FIGS. 9A and 9B illustrate examples of the data for checking. In the data for checking illustrated in FIG. 9A, a signal structure of an 8-bit checking signal VS between a 16-bit start signal SS and a 16-bit end signal ES is repeated three times. The data amount of this data for checking is 120 bits, and the track length $X_2$ needed for this data for checking is 6 mm.

In the data for checking illustrated in FIG. 9B, a signal structure of a 16-bit checking signal VS between the start signal SS and the end signal ES is repeated twice. The data amount of this data for checking is 96 bits, and the track length $X_2$ needed for this data is 4.8 mm.

The track lengths $X_2$ needed for these data for checking are both less than half of the gap dimension $L_1$ (13 mm) between the recording heads 62 and the reading heads 64. Therefore, the data for checking can be recorded twice by each of the recording heads 62 disposed on the transverse direction sides of the negative film 12, or can be recorded once by each recording head 62 alternately.

The checking signal VS may be the date, the time, a consecutive number, a random number, or any combination thereof. The checking signal VS is changed at a predetermined timing, e.g., each day, each time a predetermined period of time passes, each time a predetermined number of checks is performed, or the like, so that the same checking signal VS is not generated or the probability of generating the same checking signal VS is extremely low. In the following description, as an example, the checking signal VS is changed each time the magnetic head portions 58 are checked, i.e., each time a negative film 12 is processed at the film carrier 10.

In the data for checking illustrated in FIG. 9A, for example, random numbers may be generated for the first and last checking signals $VS_1$, $VS_3$, and the middle checking signal $VS_2$ may be set on the basis of the date and the time. Any of various methods for generating the checking signals may be used, such as setting the respective checking signals $VS_1$, $VS_2$, $VS_3$ separately.

Operation of the second embodiment will be described hereinafter.

The cartridge 20 is loaded at the cartridge loading portion 32 of the film carrier 10. When instructions are given to start exposure operation of the negative film 12, the motors 40, 44 are driven, and the negative film 12 is withdrawn from the cartridge 20 and delivered into the film accommodating portion 34 while being conveyed at a constant speed. At this time, at the film carrier 10, the magnetic information recorded on the magnetic tracks 26 of the negative film 12 is read by the reading heads 64 of the magnetic head portions 58, and the optical information recorded on the negative film 12 is read. These information are outputted to the printer processor.

Next, the motors 40, 44 are driven reversely, so that the negative film 12 is withdrawn from the film accommodating portion 34. The negative film 12 is taken up into the cartridge 20 while being frame-advanced. At this time, each image frame 16A of the negative film 12 is positioned at the opening 54 where the image is printed onto a photographic printing paper. Further, the controller 80 records, onto the magnetic tracks 26 and by the recording heads 62, magnetic information corresponding to the images for which printing has been completed.

At the film carrier 10, the operating states of the recording heads 62 and the reading heads 64 of the magnetic head portions 58 are checked before the images recorded on the negative film 12 are exposed onto the photographic printing paper. FIG. 10 illustrates an example of the checking of the magnetic head portions 58 by the controller 80. The checking based on this flowchart is carried out at each of the magnetic head portions 58 which are provided at the conveying transverse direction ends of the negative film 12.

The flowchart in FIG. 10 is implemented when a new cartridge 20 is loaded at the film carrier 10. In initial step 200, a random number is generated to set the checking signal VS, and the data for checking is set. In subsequent step 202, the motors 40, 44 are driven, and it is confirmed whether the withdrawal of the negative film 12 from the cartridge 20 has begun. When the starting of the withdrawal of the negative film 12 from the cartridge 20 is detected (i.e., when the answer to the determination in step 202 is affirmative), the routine proceeds to step 204 where direct current voltage for eliminating the magnetism of the magnetic recording layer is applied to the recording heads 62.

In subsequent step 206, a determination is made as to whether the sensors 72 have detected the leading end of the negative film 12 which has been withdrawn from the cartridge 20. In the film carrier 10, if the sensors 72 do not detect the negative film 12 even though a preset, fixed period of time has passed, the negative film 12 is deemed to have not been withdrawn excellently from the cartridge 20, and processing is discontinued.

When the leading end of the negative film 12 is detected by the sensors 72 (i.e., when the answer to the determination in step 206 is affirmative), in subsequent step 208, the negative film 12 is conveyed the length $X_1$, and it is determined whether the start position $P_4$, at which the recording of the data for checking starts, has reached the head position $P_1$ of the recording heads 62. Here, when the negative film 12 is conveyed by the length $X_1$ from the detection of the leading end thereof (i.e., the answer to the determination in step 208 is affirmative) and the position of the distance $X_3$ from the leading end of the negative film 12 opposes the recording heads 62, in step 210, recording of the data for checking onto the magnetic recording layer of the negative film 12 by the recording heads 62 begins. In this way, the checking tracks 28 on which the data for checking is recorded are formed on the negative film 12. At this time, because the start position $P_4$ on the negative film 12 has not reached the head position $P_2$ of the reading heads 64, the reading of the magnetic information by the reading heads 26 has not yet been started.

When recording of the data for checking is completed, in step 212, direct current voltage is again applied to the recording heads 62 in order to eliminate the magnetism of the magnetic recording layer until a fixed position of the leader portion 14 (e.g., the magnetic track 26 side end portions of the blank regions 90).

In step 214, the reading heads 64 read the magnetic information (data) from the negative film 12. At this time, because the recording of the data for checking by the recording heads 62 is completed, the magnetism generated when the recording heads 62 are recording the data for checking does not affect the data read by the reading heads 64, and the data recorded on the checking tracks 28 of the negative film 12 can be read accurately.

When the reading of the data from the checking tracks 28 by the reading heads 64 is completed, in step 216, the data for checking and the data read by the reading heads 64 are compared. A determination is made as to whether the data for checking and the data read by the reading heads 64 match (step 218). When the data match (i.e., when the determination is affirmative), the magnetic head checking routine is completed.

In the film carrier 10, when magnetic head checking is completed, the reading heads 64 begin to read the magnetic information from the magnetic tracks 26 of the negative film 12 which is being conveyed at a constant speed, and the processing of the negative film 12 continues.

On the other hand, if the data for checking and the data read by the reading heads 64 does not match, the answer to the determination in step 218 is negative, and the routine proceeds to step 220. In step 220, an alarm is sounded or the like, notification is given that the operation of the magnetic head portions 58 is abnormal, and cancellation of the processing of the negative film 12 is advised.

At the film carrier 10, when a decision is made to cancel processing due to the routine for checking the magnetic head portions 58, processes such as the following may be carried out. The reading of the magnetic information from the magnetic tracks 26 of the negative film 12 is stopped. The motors 40, 44 are driven reversely, and the negative film 12 which had been withdrawn from the cartridge 20 is rewound into the cartridge 20.

The data for checking, which is recorded on the negative film 12 by the recording heads 62, and the data, which corresponds to the data for checking and which is read from the negative film 12 by the reading heads 64, are compared. Reasons why these data do not match may be dirt adhering to at least one of the recording heads 62 and the reading heads 64, or trouble such as the rupture of a coil in the interior of a head, or the like. In any case, it is difficult for magnetic information to be accurately read from the magnetic tracks 26 of the negative film 12, and difficult for magnetic information to be recorded onto the magnetic tracks 26 of the negative film 12. Further, dirt adhering to the recording heads 62 or the reading heads 64 may damage the surface of the negative film 12, and poor operation of the recording heads 62 may damage the magnetic information recorded on the negative film 12.

By checking for such troubles with the magnetic head portions 58 before the negative film 12 is processed, appropriate processing of the negative film 12 at the film carrier 10 is carried out, and damage to the negative film 12 or the like can be prevented.

The recording heads 62 and the reading heads 64 mutually confirm whether they are operating properly. Therefore, for example, there is no need to provide, in addition to the reading head 64, another reading head for reading the magnetic information recorded by the recording head 62 and confirming the operating state of the recording head 62. Further, the track length $X_2$ of the checking tracks 28 on which the data for checking is recorded is smaller than the head gap dimension $L_1$ which is the interval between the recording head 62 and the reading head 64. Therefore, the present invention does not preclude compact sizing of the film carrier 10. More specifically, even if the interval between the recording head 62 and the reading head 64 of the film carrier 10 is made short so as to make the film carrier 10 more compact, the amount of data of the data for checking is set such that the track length $X_2$ of the checking track 28 is shorter than the head gap dimension $L_1$. In this way, the magnetism generated by the recording heads 62 does not affect the reading of data by the reading heads 64, and accurate reading of data is possible.

When there is some trouble with the recording heads 62 such that data cannot be recorded, and when the data for checking formed on the negative film 12 a previous time still remains, there is the possibility that the data for checking from the previous time will be read by the reading heads 64. If the data for checking from the previous time and the data for checking for this time are the same, it will be determined that the magnetic head portions 58 are operating normally. At the film carrier 10, each time a negative film 12 is processed, a random number, or a random number and the date, or the like are used to generate the data for checking, and data for checking which is different than the data for checking for the previous time is used. Therefore, whether the recording heads 62 and the reading heads 64 are operating appropriately can be accurately determined each time checking is effected.

The data for checking used in the above-described checking is not limited to a random number, and may be the date when the data for checking was generated, or the date and the time, or the time and a consecutive number, or any combination of these with a random number, or a random number generated on the basis of these combinations, or the like.

In the above description, the data for checking is generated each time a negative film 12 is processed. However, the generation and changing of the data for checking is not limited to the same. More specifically, dirt adhering to the recording heads 62 and the reading heads 64 due to the processing of the negative films 12 accumulates gradually. Improper operation by the recording head 62 or the reading head 64 or the inability of the recording head 62 or the reading head 64 to operate due to such dirt does not occur suddenly; as more dirt gradually adheres, such improper operation or inability to operate occurs more easily. In light of these circumstances, the data for checking does not have to be changed each time checking is performed.

The data for checking may be changed each time a predetermined number of checks is carried out. In this case, the controller 80 may be provided with a counter function. The number of times negative films 12 are processed (i.e., the number of times checking is performed) is counted by the counter, and the data for checking is changed when the count value reaches a preset value. Here, the data for checking may be the date (e.g., the year, month, and date), the time (the hour and the minutes or the minutes and the seconds), the date and the time, some combination of these with a consecutive number or a random number, a random number generated on the basis of the date or the time or the date and the time, or the like.

The data for checking may be changed each time a predetermined period of time passes, such as each day or after a fixed period of time elapses or the like. For example, if the data for checking is changed each day, the data for checking could be generated before the processing at the film carrier 10 begins for the day. If the data for checking is changed each time a fixed period of time passes, the controller 80 could measure the elapsed time, and the data for checking could be changed each time a predetermined amount of time passes such as each time one hour or two hours has passed, for example.

The data for checking which is changed each time a predetermined period of time passes may be the date, the date and the time, the date and a random number, the date and the time and a random number, the date and a random number generated on the basis of the date, a random number generated on the basis of the date and the time, or the like.

The time at which the data for checking is changed may be selected on the basis of a combination of the time which has elapsed and the processed amount. In this case, the number of negative films 12 which have been processed is counted, and the elapsed time is measured. The data for checking is changed when either reaches a predetermined value (a predetermined time). In this way, when a large number of negative films 12 are processed at the film carrier 10 in a short time, dirt adhering to the recording heads 62 and the reading heads 64 due to the processing of the large number of negative films 12 can be handled.

The film carrier 10 described above does not limit the applications of the present invention. The above embodiments describe the present invention as used in the film carrier 10 at which the negative film 12 is loaded when images recorded on the negative film 12 are printed onto a photographic printing paper. However, the present invention is not limited to the same. When a recording head and a reading head for recording and reading magnetic information onto and from the negative film 12 are provided at a scanner or an analyzer which reads the images of the negative film 12 and is used in the inspection of negative films, or at an index printer for preparing an index print in which the images recorded on one negative film are disposed in a matrix format, or at a television photoplayer which displays on a display or the like the images recorded on the negative film 12, or the like, the present invention can be used for checking the recording head and the reading head and for easily checking whether the recording head and the reading head are operating appropriately.

In the above-described embodiments, the negative film 12 is used as a strip-shaped magnetic material. However, the strip-shaped magnetic material may be a video tape, a cassette tape, or the like. The present invention can be applied to the checking of a recording head and a reading head provided for recording and reading magnetic information onto and from the video tape, the cassette tape, or the like.

As described above, in the method for checking magnetic heads of the second embodiment, checking of the recording heads and the reading heads is carried out before magnetic information is recorded onto the strip-shaped magnetic material by the magnetic heads and magnetic information is read from the strip-shaped magnetic material by the magnetic heads. Therefore, accurate recording of magnetic information and accurate reading of the recorded magnetic information are made possible.

Further, in the second embodiment of the present invention, the data for checking is changed at a predetermined timing. Therefore, data for checking recorded the previous time is not erroneously read as data for checking of the present time, and the operation of the recording heads and the reading heads can be appropriately checked.

In the second embodiment, the recording heads and the reading heads are operated separately. Therefore, the magnetism when the recording heads record the data for checking is prevented from affecting the operation of the reading heads. A superior effect is achieved in that it can be accurately checked whether the recording heads and the reading heads are operating appropriately.

While the embodiments of the present invention as herein disclosed constitute a preferred form, it is to be understood that other forms might be adopted.

What is claimed is:

1. A method for checking magnetic heads which are respectively formed by a recording head and reading head pair, said recording head recording magnetic information onto a strip-shaped magnetic material which is being conveyed, and said reading head reading magnetic information from the strip-shaped magnetic material, said method comprising:

while conveying the strip-shaped magnetic material in a conveying direction, recording checking data for checking operation of said recording head and said reading head on a predetermined position of a conveying direction leading end portion of the strip-shaped magnetic material by said recording head before processing of the strip-shaped magnetic material, and after said recording and while still conveying the strip-shaped magnetic material in the conveying direction, reading the checking data recorded on the strip-shaped magnetic material, by said reading head which is disposed at a downstream side of said recording head in the conveying direction of the strip-shaped magnetic material; and checking whether said recording head and said reading head are operating appropriately by comparing the read data and the checking data for checking;

wherein said checking data does not affect recorded magnetic information regarding any of said strip-shaped magnetic material and a photography condition.

2. A method for checking magnetic heads according to claim 1, wherein the checking data recorded on the strip-shaped magnetic material by said recording head is changed at a predetermined timing.

3. A method for checking magnetic heads according to claim 2, wherein the checking data recorded on the strip-shaped magnetic material by said recording head is changed each time writing on the strip-shaped magnetic material is carried out by said recording head.

4. A method for checking magnetic heads according to claim 1, wherein a length, in a conveying direction of the strip-shaped magnetic material, of a portion of the strip-shaped magnetic material on which the checking data is written is shorter than an interval, along the conveying direction of the strip-shaped magnetic material, between a position at which the recording head records and a position at which said reading head reads.

5. A film carrier, comprising:

conveying/positioning means for conveying a photographic film along a conveying path in a conveying direction, and for positioning the photographic film at a predetermined exposure position;

a recording head able to record magnetic information on magnetic recording layers of the photographic film;

a reading head provided on the conveying path downstream from said recording head in the conveying direction, said reading head reading magnetic information recorded on the magnetic recording layers of the photographic film while the photographic film is being conveyed; and checking means for effecting recording by said recording head of checking data for checking operation of said recording head and said reading head onto a predetermined magnetic recording layer when the photographic film is being conveyed in the conveying direction, and for effecting reading by said reading head of the recorded checking data when the photographic film is being conveyed in the conveying direction, and comparing the read data with the recorded checking data;

wherein said checking data does not affect recorded magnetic information regarding any of said photographic film and a photography condition.

6. The film carrier according to claim 5, wherein the checking means changes the checking data at a predetermined timing.

7. The film carrier according to claim 5, wherein the checking means changes the checking data each time writing on the predetermined magnetic recording layer is carried out by said recording head.

8. The film carrier according to claim 5, wherein a length, in the conveying direction, of the predetermined magnetic recording layer on which the checking data is written is shorter than an interval, along the conveying direction, between a position at which said recording head records and a position at which said reading head reads.

9. A method for checking magnetic heads which are respectively formed by a recording head and reading head pair, said recording head recording magnetic information onto a strip-shaped magnetic material which is being conveyed, and said reading head reading magnetic information from the strip-shaped magnetic material, said method comprising:

while conveying the strip-shaped magnetic material in a conveying direction, recording checking data for checking operation of said recording head and said reading head on a predetermined position of a conveying direction leading end portion of the strip-shaped magnetic material by said recording head before processing of the strip-shaped magnetic material, and after said recording and while still conveying the strip-shaped magnetic material in said conveying direction without conveying the strip-shaped magnetic material in a direction which is opposite to said conveying direction, reading the checking data recorded on the strip-shaped magnetic material, by said reading head which is disposed at a downstream side of said recording head in said conveying direction of the strip-shaped magnetic material; and checking whether said recording head and said reading head are operating appropriately by comparing the read data by said reading head and the recorded checking data for checking.

10. A film carrier, comprising:

conveying/positioning means for conveying a photographic film along a conveying path in a conveying direction, and for positioning the photographic film at a predetermined exposure position;

a recording head able to record magnetic information on magnetic recording layers of the photographic film;

a reading head provided on the conveying path downstream from said recording head in the conveying direction, said reading head reading magnetic information recorded on the magnetic recording layers of the photographic film while the photographic film is being conveyed; and checking means for effecting recording by said recording head of checking data for checking operation of said recording head and said reading head onto a predetermined magnetic recording layer when the photographic film is being conveyed in said conveying direction, and for effecting reading by said reading head of the recorded checking data when the photographic film is being conveyed in said conveying direction without conveying the strip-shaped magnetic material in a direction which is opposite to said conveying direction, and comparing the read data by said reading head with the recorded checking data;

wherein a length, in a conveying direction of the strip-shaped magnetic material, of a portion of the strip-shaped magnetic material on which the checking data is written is shorter than an interval, along the conveying direction of the strip-shaped magnetic material, between a position at which the recording head records and a position at which said reading head reads.

11. A method for checking magnetic heads which are respectively formed by a recording head and reading head pair, said recording head recording magnetic information onto a strip-shaped magnetic material which is being conveyed, and said reading head reading magnetic information from the strip-shaped magnetic material, said method comprising:

while conveying the strip-shaped magnetic material in a conveying direction, recording checking data for checking operation of said recording head and said reading head on a predetermined position of a conveying direction leading end portion of the strip-shaped magnetic material by said recording head before processing of the strip-shaped magnetic material, and after said recording and while still conveying the strip-shaped magnetic material in said conveying direction without conveying the strip-shaped magnetic material in a direction which is opposite to said conveying direction, reading the checking data recorded on the strip-shaped magnetic material, by said reading head which is disposed at a downstream side of said recording head in said conveying direction of the strip-shaped magnetic material; and checking whether said recording head and said reading head are operating appropriately by comparing the read data by said reading head and the recorded checking data for checking.

12. A film carrier, comprising:

conveying/positioning means for conveying a photographic film along a conveying path in a conveying direction, and for positioning the photographic film at a predetermined exposure position;

a recording head able to record magnetic information on magnetic recording layers of the photographic film;

a reading head provided on the conveying path downstream from said recording head in the conveying direction, said reading head reading magnetic information recorded on the magnetic recording layers of the photographic film while the photographic film is being conveyed; and checking means for effecting recording by said recording head of checking data for checking operation of said recording head and said reading head onto a predetermined magnetic recording layer when the photographic film is being conveyed in said conveying direction, and for effecting reading by said reading head of the recorded checking data when the photographic film is being conveyed in said conveying direction without conveying the strip-shaped magnetic material in a direction which is opposite to said conveying direction, and comparing the read data by said reading head with the recorded checking data;

wherein a length, in the conveying direction, of the predetermined magnetic recording layer on which the checking data is written is shorter than an interval, along the conveying direction, between a position at which said recording head records and a position at which said reading head reads.

* * * * *